(12) United States Patent
Manley (10) Patent No.: US 9,566,536 B2
(45) Date of Patent: Feb. 14, 2017

(54) VARIABLE LENGTH OXER AND METHOD OF USING SAME

(71) Applicant: EquiOxer, LLC, Dover, NH (US)

(72) Inventor: Andrea Manley, Dover, NH (US)

(73) Assignee: Equioxer, LLC, Dover, NH (US)

( * ) Notice: Subject to any disclaimer, the term of this patent is extended or adjusted under 35 U.S.C. 154(b) by 64 days.

(21) Appl. No.: 14/459,981

(22) Filed: Aug. 14, 2014

(65) Prior Publication Data

US 2016/0045840 A1    Feb. 18, 2016

(51) Int. Cl.
*A63K 3/04* (2006.01)
*A01K 15/02* (2006.01)

(52) U.S. Cl.
CPC .............. *A63K 3/046* (2013.01); *A01K 15/02* (2013.01)

(58) Field of Classification Search
CPC ........... A63K 3/04; A63K 3/043; A63K 3/046
USPC ............................................ 119/705; 482/16
See application file for complete search history.

(56) References Cited

U.S. PATENT DOCUMENTS

| | | | | |
|---|---|---|---|---|
| 1,910,080 A | * | 5/1933 | Austin | A63K 3/043 482/17 |
| 2,989,309 A | * | 6/1961 | Conrad | A63K 3/046 119/705 |
| 3,366,406 A | | 1/1968 | Morris | |
| 5,690,583 A | | 11/1997 | Keusch | |
| 5,967,093 A | * | 10/1999 | Vitt | A63K 3/046 119/705 |
| 2003/0084857 A1 | | 5/2003 | Gavet | |
| 2005/0224014 A1 | * | 10/2005 | Diaz | E04H 12/2238 119/705 |
| 2006/0283399 A1 | | 12/2006 | Bolduc | |
| 2013/0228137 A1 | | 9/2013 | Gemino et al. | |

FOREIGN PATENT DOCUMENTS

| | | | |
|---|---|---|---|
| DE | 4227108 C1 | 10/1993 | |
| DE | 1999-097387 | * 1/1999 | ............... A63K 3/04 |
| DE | 10034966 A1 | 2/2002 | |
| DE | 200610025574 A1 | 12/2007 | |
| GB | 2244928 A | 6/1990 | |
| WO | 2004022193 A1 | 3/2004 | |
| WO | 2006063643 A1 | 6/2006 | |
| WO | 2007080192 A1 | 7/2007 | |

* cited by examiner

*Primary Examiner* — Danielle Clerkley
(74) *Attorney, Agent, or Firm* — Davis & Bujold, P.L.L.C.; Kimberly A. Peaslee (57) ABSTRACT

The system and method of training an animal to jump using a variable length oxer. The oxer having one or more jump cups located on an adjustable length arm to provide for a jump of varying depth and/or height. The oxer mounts to a standard using a variety of mechanisms. The mount may comprise a jump cup. The oxer may comprise a counterweight and/or a support leg.

14 Claims, 11 Drawing Sheets

VARIABLE LENGTH OXER AND METHOD OF USING SAME

FIELD OF THE INVENTION

The present invention relates to horse jumping equipment and more particularly to a device used to extend the depth of a jump using only a single pair of standards.

BACKGROUND OF THE INVENTION

The official practice of horse jumping has been around for at least as early as the 1700s when the British parliament enacted the Enclosures Act, which required that lands be fenced off from one another. From that point on, a horse needed to be able to jump a fence so the rider could pursue game and reach their destination more quickly than having to go around fenced-in areas of land. In less than a hundred years, the art of show jumping had become well known in Europe. Now horse jumping is a worldwide activity; spanning continents and is represented in three components of the summer Olympics.

Typically when a person is training a horse to jump, a stand-alone portion of fence is erected using two end pieces, or standards, to hold a pole, a bar, a gate or the like between the "posts." Standards can be made up of a single post, a short section of fence, a column, or any other decorative and/or functional arrangement. Standards typically range in weights from 15 pounds to about 35 pounds, with modified standards weighing as much as 100 pounds. Standards can be made out of various materials, including wood, metal, stone, plastic, and the like.

Between the pair of standards, a pole, a bar, a gate, a plank, a panel, decorative wall, or the like is supported and this is the object over which the horse jumps. For simplicity, a pole will be used herein to describe the object that the horse is trained to jump over, but it will be appreciated by those of ordinary skill that a "pole" can include, but is not limited to a gate, a bar, a portion of fence, a plank, a panel, a decorative wall, and the like.

Oftentimes, standards have a series of holes drilled along the height of the standard facing the inside of the jump or a patterned track, which allows jump cups, or arced supports, to be attached to the standards at various heights. These jump cups hold the pole in position. Jump cups can comprise a shallow arc or flat surface so the pole can easily "break away" if the horse's foot comes in contact with the pole during a jump. Jump cups can also be "deep" to hold the pole in position. Jump cups can also be a breakaway style jump cup. These are designed to break away from the standard and fall straight down should enough pressure be exerted on them.

Currently, when a rider wishes to train a horse to jump a certain distance, in addition to a certain height, they must install a second pair of standards and a second pole at a certain distance in front of the first pair of standards. This not only increases cost, but also requires more time to set up and transport equipment. Another alternative is for the rider or trainer to purchase modified standards. Modified standards are fixed in width, heavy, and expensive.

One object of the present invention is to provide a device that allows trainers, riders and the like to train horses to jump distances using only a single pair of standards. The device of the present invention saves the user time, money, storage space, and labor. The present invention allows for more flexibility in set up and reduces the possibility of injury by reducing the amount of equipment needed to transport and move to set up a course.

SUMMARY OF THE INVENTION

It has been recognized that people have been training animals to run obstacle courses for several hundred years using sections of fencing to establish a height for the animal to jump, and using a second section of fencing some distance from the first section of fence to establish a distance for the animal to jump. For simplicity, the animals discussed herein will be horses, but it is understood that this technique and device will work for other animals such as dogs, donkeys, mules, and other equines. Human competitions/obstacle courses are another potential use for the present invention.

One aspect of the present invention is an apparatus used for creating a jump comprising, an arm having a first end and a second end; a jump cup attached to the first end of the arm; a mount attached to the first end of the arm; and an auxiliary jump cup attached to the second end of the arm.

One embodiment of the apparatus used for creating a jump is wherein the arm is adjustable in length.

One embodiment of the apparatus used for creating a jump is wherein the mount attaches to a standard using a pin mechanism.

One embodiment of the apparatus used for creating a jump is wherein the jump cup is configured to support a first pole and the auxiliary jump cup is configured to support a second pole.

One embodiment of the apparatus used for creating a jump is wherein the arm adjustably pivots in the mount to provide staggered heights for the first and second poles.

One embodiment of the apparatus used for creating a jump further comprises a counterweight.

One embodiment of the apparatus used for creating a jump further comprises a support leg.

One embodiment of the apparatus used for creating a jump is wherein the support leg is adjustable.

One embodiment of the apparatus used for creating a jump is wherein the mount attaches to a standard using a clamp mechanism.

Another aspect of the present invention is an apparatus used for creating a jump comprising, an arm having a first end and a second end; a mount attached to the first end of the arm; and an auxiliary jump cup attached to the arm.

One embodiment of the apparatus used for creating a jump is wherein the arm is adjustable in length.

One embodiment of the apparatus used for creating a jump is wherein the mount attaches to a standard using a pin mechanism.

One embodiment of the apparatus used for creating a jump is wherein the auxiliary jump cup is configured to support a pole.

One embodiment of the apparatus used for creating a jump is wherein the arm adjustably pivots in the mount to provide an adjustable height for the pole.

One embodiment of the apparatus used for creating a jump further comprises a counterweight.

One embodiment of the apparatus used for creating a jump further comprises a support leg.

One embodiment of the apparatus used for creating a jump is wherein the support leg is adjustable.

One embodiment of the apparatus used for creating a jump is wherein the auxiliary jump cup is slideably attached to the arm.

One embodiment of the apparatus used for creating a jump is wherein the mount attaches to a standard using a clamp mechanism.

Another aspect of the present invention is an apparatus used for creating a jump comprising, a length-adjustable arm having a first end and a second end; a mount attached to the first end of the arm, wherein the mount attaches to a standard; and an auxiliary jump cup attached to the second end of the arm, wherein the auxiliary jump cup is configured to support a pole.

These aspects of the invention are not meant to be exclusive and other features, aspects, and advantages of the present invention will be readily apparent to those of ordinary skill in the art when read in conjunction with the following description, appended claims, and accompanying drawings.

BRIEF DESCRIPTION OF THE DRAWINGS

The foregoing and other objects, features, and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Currently, when a person wishes to train a horse to jump a certain distance, in addition to a certain height, they must install a second pair of standards and a second pole at the desired distance in back of the first pair of standards. This not only increases cost, but also requires more time to set up and transport equipment.

One example of a jump support that is capable of providing multiple poles at a variety of heights and widths is shown in UK Patent Publication GB 2 244 928. There, a complex support system is used in a variety of configurations to provide for a variety of jumps. One drawback of this system is that it is a system that is not compatible with current systems and thus adds to the cost of adopting. Another drawback of this system is that it is heavy and bulky and creates a problem of both storage and transport. Another drawback of this system is that the widths and heights are fixed. Additionally, due to the size and weight of the jump supports described therein it likely requires more than one person to set up and safely move the configuration.

Another example of a jump support that is capable of providing multiple poles at a variety of heights and widths is shown in International Patent Publication WO 2007/080192. There, a modified standard is used to accept a pivotally mounted jump cup arm with a series of holes at predetermined distances that can be used to accept one or more jump cups. One drawback of this system is that depending on the orientation used for the multiple poles, there is an increased possibility for injury to the horse as there is excess "arm" jutting out in front of the pole, behind the pole, or both. It also appears that if the horse was to hit one of the poles and the arm was to pivot it could create an additional hazard to the horse. Another drawback of this system is that it is bulky which can create a problem of both storage and transport.

Figure 1:
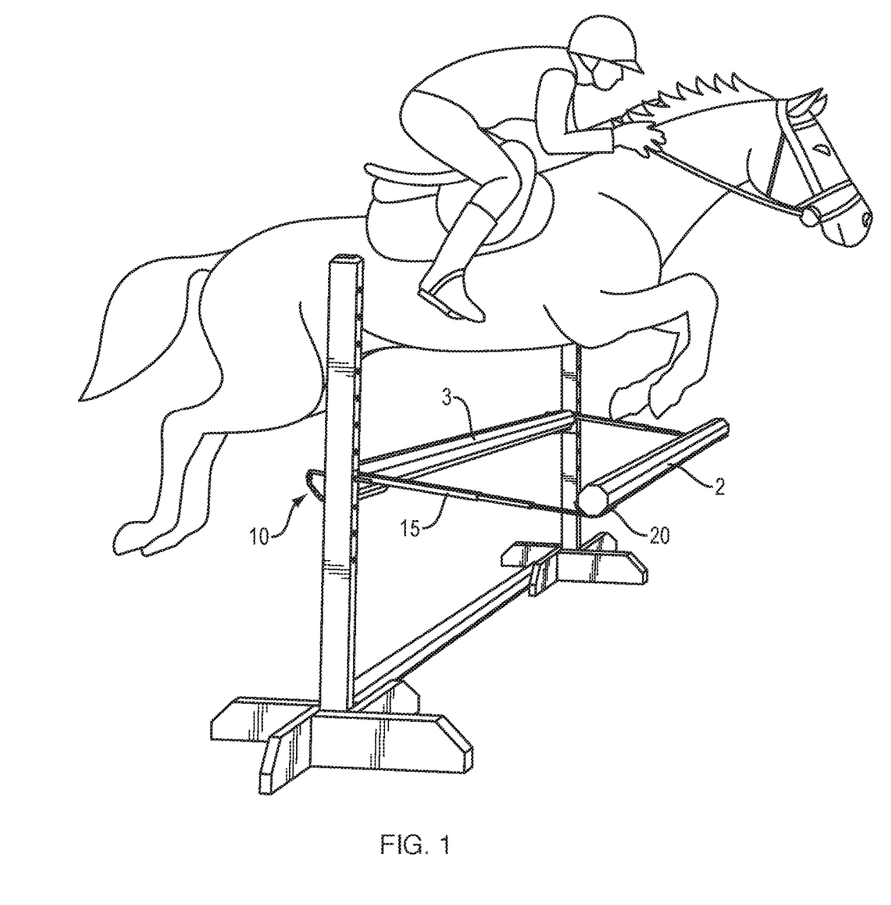
FIG. 1 shows a rider jumping a horse over one embodiment of the device of the present invention.

Referring to FIG. 1, a rider jumping a horse over one embodiment of the device of the present invention is shown. More particularly, in this embodiment the devices are installed on a pair of standards 1 using pinned jump cups 10, as better shown in FIG. 3, and shallow jump cups 20 used to hold a second pole 2 that establishes the depth of the jump to be performed. In certain embodiments of the present invention, the first jump cup 10 is connected to the auxiliary jump cup 20 by an arm 15. In certain embodiments, the arm may be round, square, or any other shape. In certain embodiments, the arm may be telescoping or adjustable. In certain embodiments, the arm may be comprised of tapered poles and the like.

Figure 2:
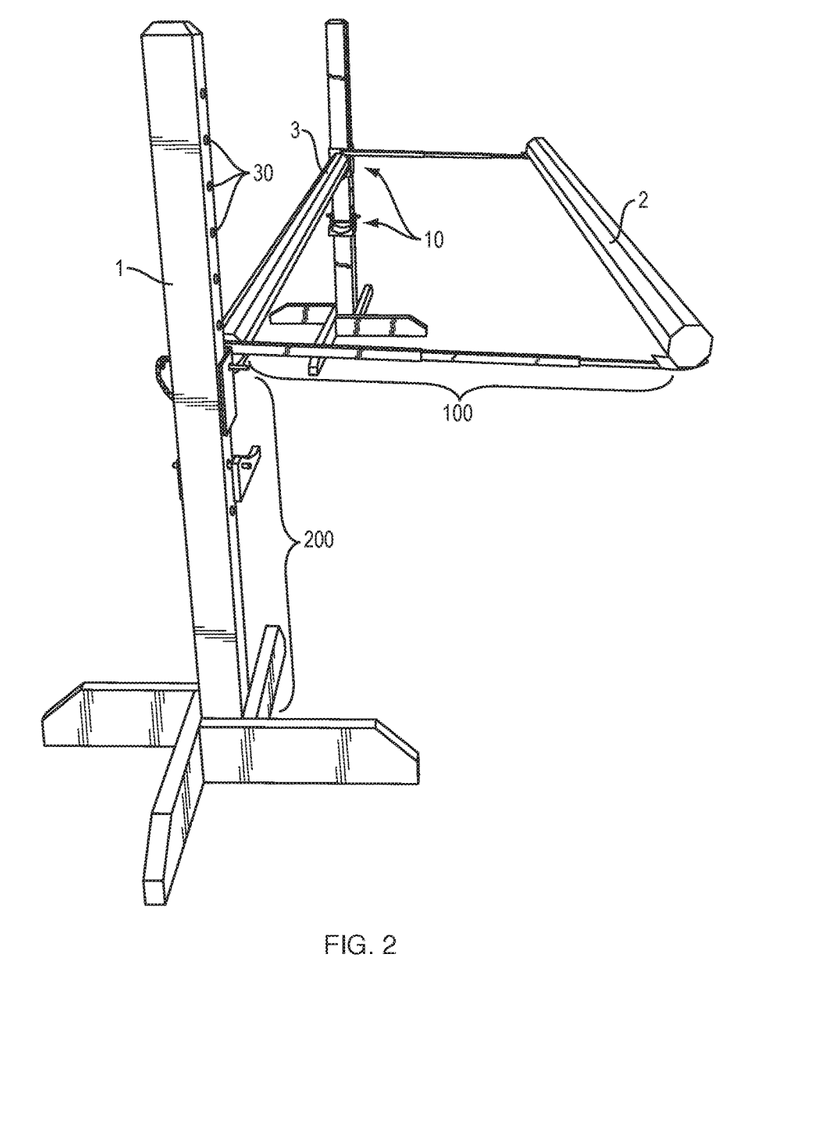
FIG. 2 shows one embodiment of the device of the present invention installed on a pair of single post standards.

Referring to FIG. 2, one embodiment of the device of the present invention is shown installed on a pair of single post standards. More particularly, a pair of standards 1 are shown with the devices installed using pinned jump cups 10. In certain embodiments, there are a series of holes 30 in the standard that allow for placement of the jump cups 10 at various heights. The jump cups function to hold a first pole 3 at a particular height. The devices further function to hold a second pole 2 at a particular distance from the standards to create a jump of a particular height 200 and depth 100. In certain embodiments, the auxiliary jump cups 20, just like the jump cups 10, can be curved, flat, or open-ended.

In certain embodiments, jump cups may attach to the arm in a variety of ways including, but not limited to clamps, pins, ties, welding or other methods of joining, keyhole slots, suction, magnets, self-adhesives, and the like. In certain embodiments, auxiliary jump cups may attach to the arm in a variety of ways including, but not limited to clamps, pins, ties, welding or other methods of joining, keyhole slots, suction, magnets, self-adhesives, and the like. In certain embodiments, the device may have a jump cup. In certain embodiments, the device may have one or more auxiliary jump cups.

Figure 3:
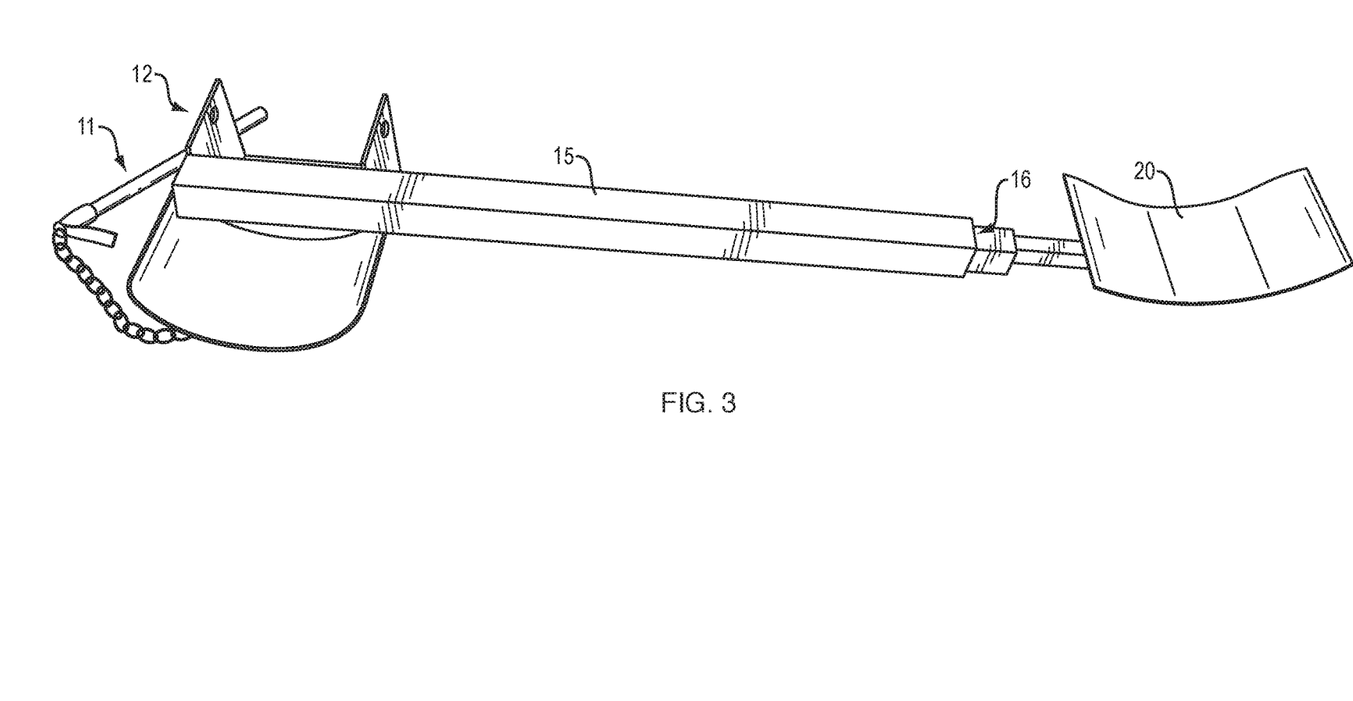
FIG. 3 shows one embodiment of the device of the present invention.

Referring to FIG. 3, one embodiment of one of the devices of the present invention is shown. More particularly, the device comprises an arm 15, a jump cup 10 and an auxiliary jump cup 20. In certain embodiments, the jump cup is attached to the standard (not shown) using a pin 11 passed through the standard via holes 12 in the mount. In certain embodiments, an auxiliary cup is located at the end of the arm. In certain embodiments, the auxiliary jump cup is located on the arm between the first end (where the arm attaches to the standard) and the second end. In certain embodiments, the device may contain a locking system to prevent poles from moving while in use. In certain embodiments, the locking system can include, but is not limited to, incremental holes with a spring pin, v-pin, or other style pin, a twist lock, a clamp lock, and the like.

Figure 4:
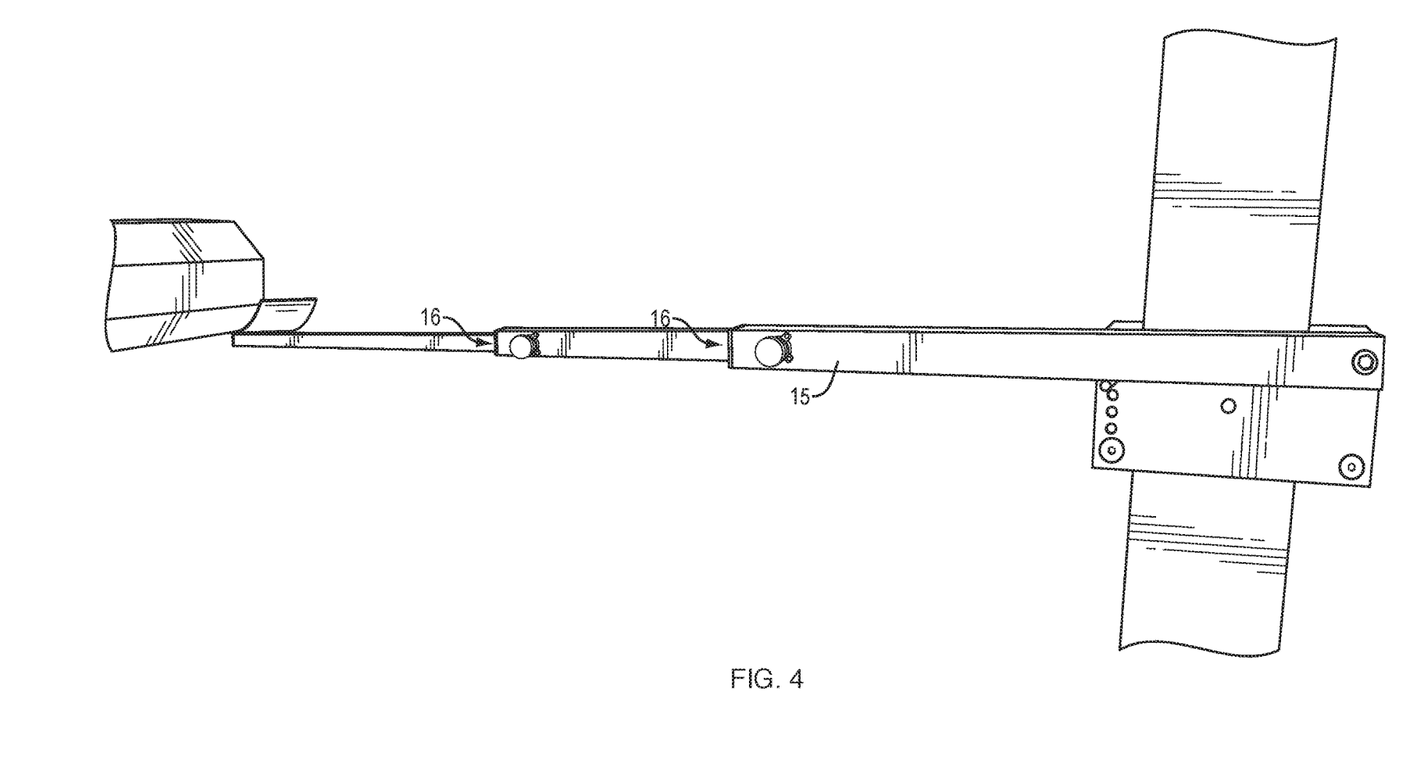
FIG. 4 shows one embodiment of the device of the present invention with an adjustable length arm.

Referring to FIG. 4, one embodiment of the device of the present invention is shown. More particularity, the arm 15 comprises portions 16 that provide for an adjustment of the length of the arm. In certain embodiments, the length of the arm can be adjusted 16 using a variety of mechanisms known to those of skill in the art including, but not limited to, clamps, pins, buttons, suction, magnets, and the like.

In certain embodiments of the present invention, the arm may extend from about 2 inches to about 48 inches. In certain embodiments of the present invention, the device may be about 6 inches to about 50 inches long.

In certain embodiments of the present invention, the device may comprise support legs. In certain embodiments, the support legs may be telescoping. In certain embodiments of the present invention, the device may comprise a counter weight.

Figure 5A:
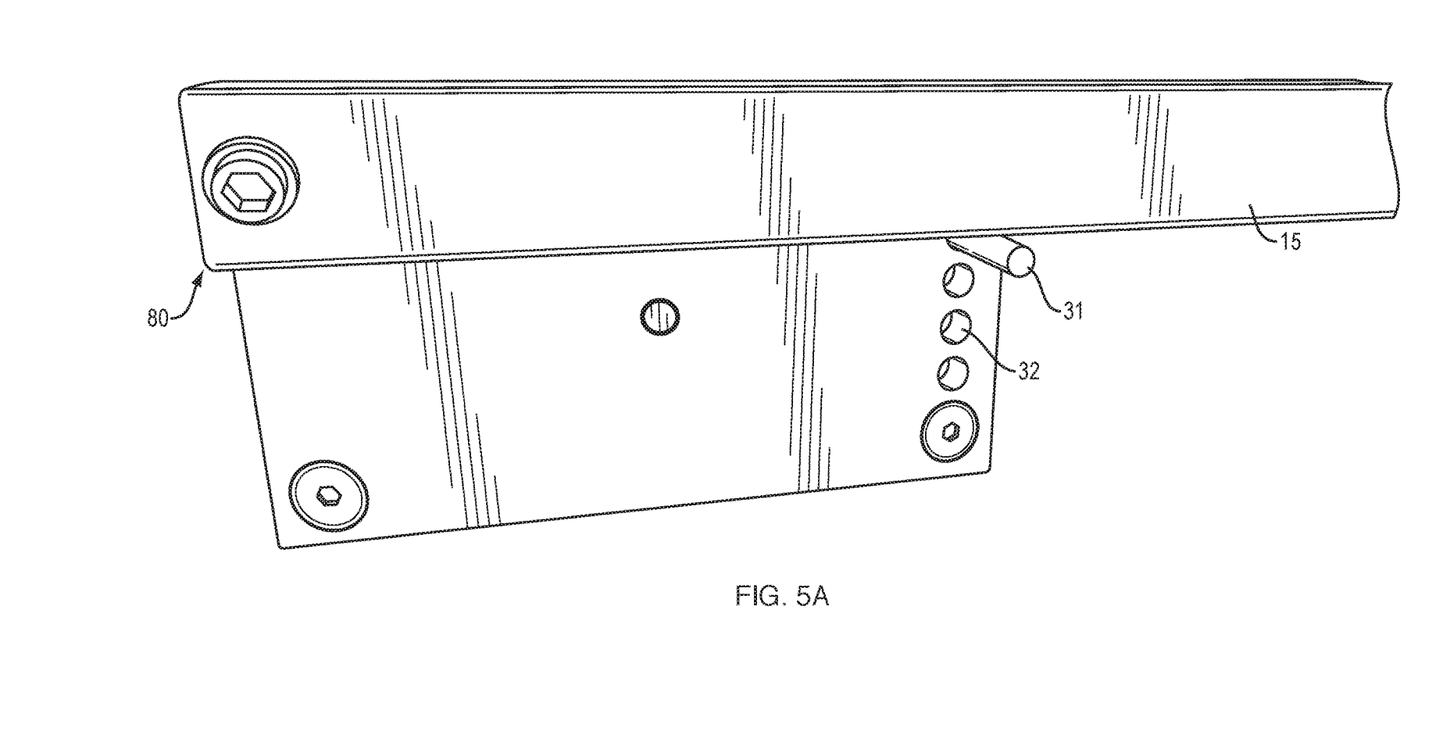
FIGS. 5A and 5B show embodiments of the device of the present invention with a hinged portion.
Figure 5B:
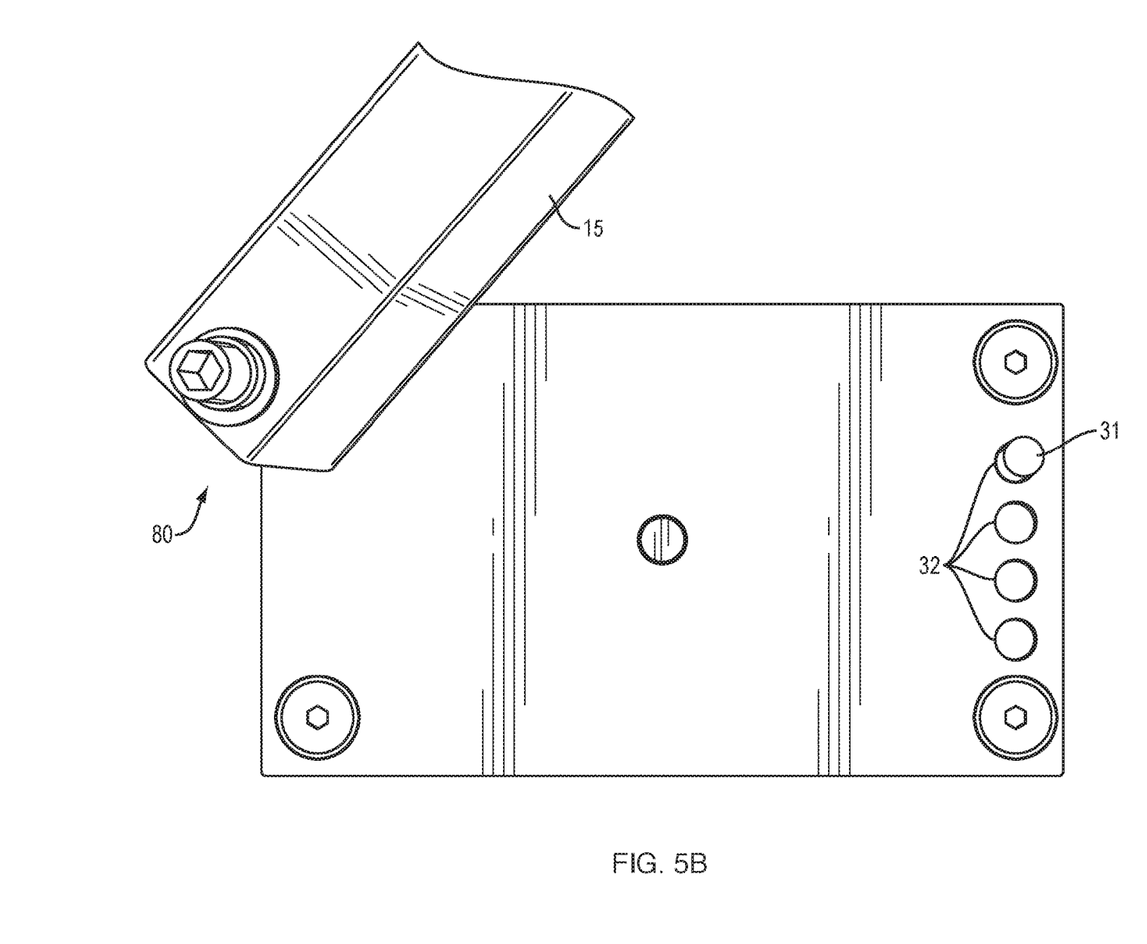

In certain embodiments of the present invention, the device may pivot to provide for poles of staggered heights. In certain embodiments of the present invention, the device may be hinged to provide an adjustable height for the second pole. Referring to FIGS. 5A and 5B, one embodiment of a device with a hinged portion is shown. FIG. 5A shows the arm 15 resting on a shear pin 31 located in one of several holes 32 used to adjust the height of the second pole using a hinged portion 80. It is understood that other mechanisms of adjustment are possible including, but not limited to hinges, pivots, additional auxiliary jump cups, and the like.

FIG. 5B shows the arm 15 lifted to aid in the adjustment of the shear pin 31 into one of several holes 32 in one embodiment of the present invention. There are several holes where the shear pin can be placed. In certain embodiments, the movement of the pin from one hole to the next will adjust the height of the second pole by about an inch. Depending on the placement of the holes 32, the height adjustment can be more or less fine. In certain embodiments, the first pole should never be lower than the second pole. In certain embodiments, if enough downward pressure is exerted on the jump pole or on the device then the shear pin 31 will break and the arm 15 will hinge downward, out of the way of the horse and/or rider.

Figure 6A:
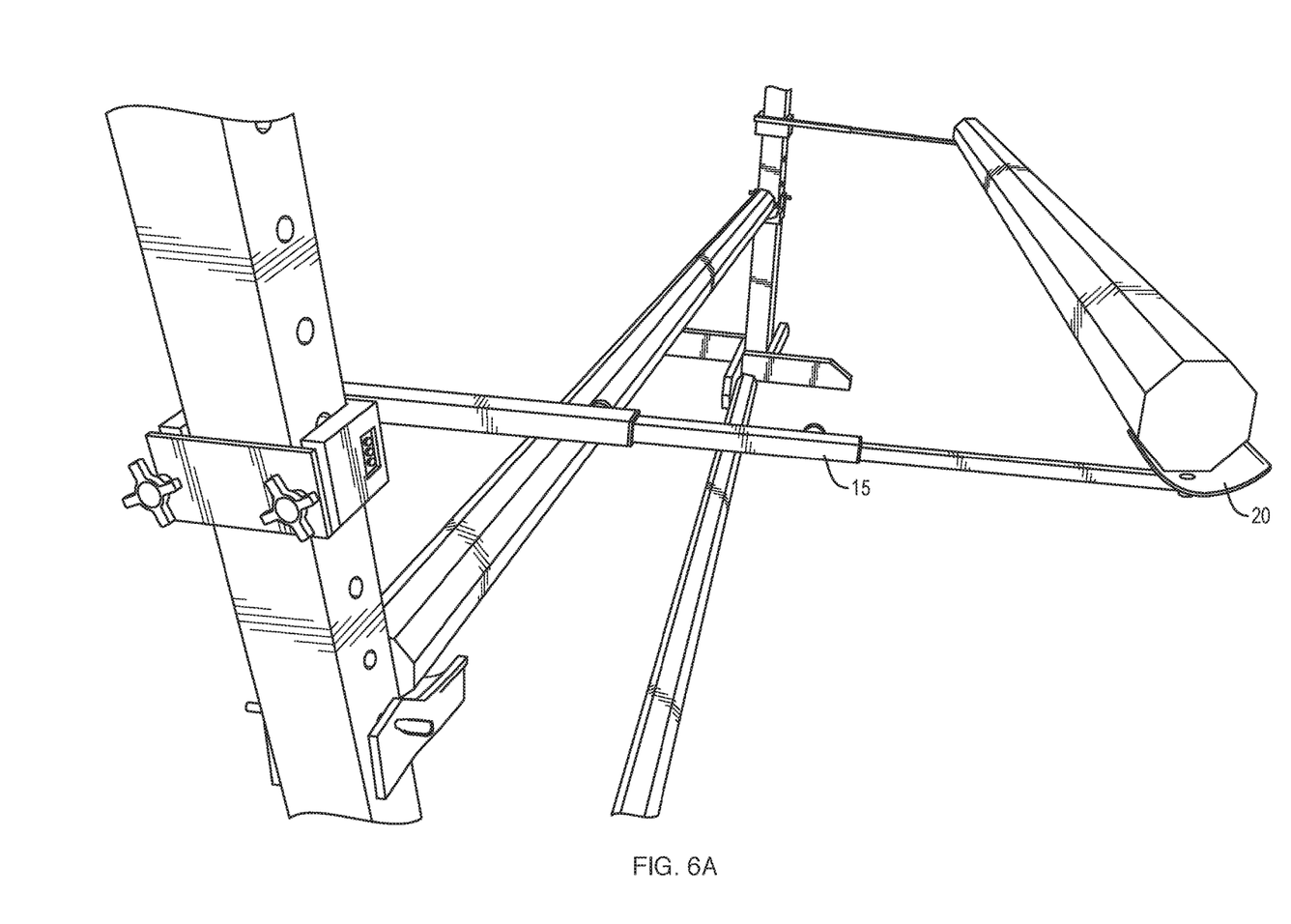
FIG. 6A and FIG. 6B show embodiments of the device of the present invention with an auxiliary jump cup located at the end of the arm.
Figure 6B:
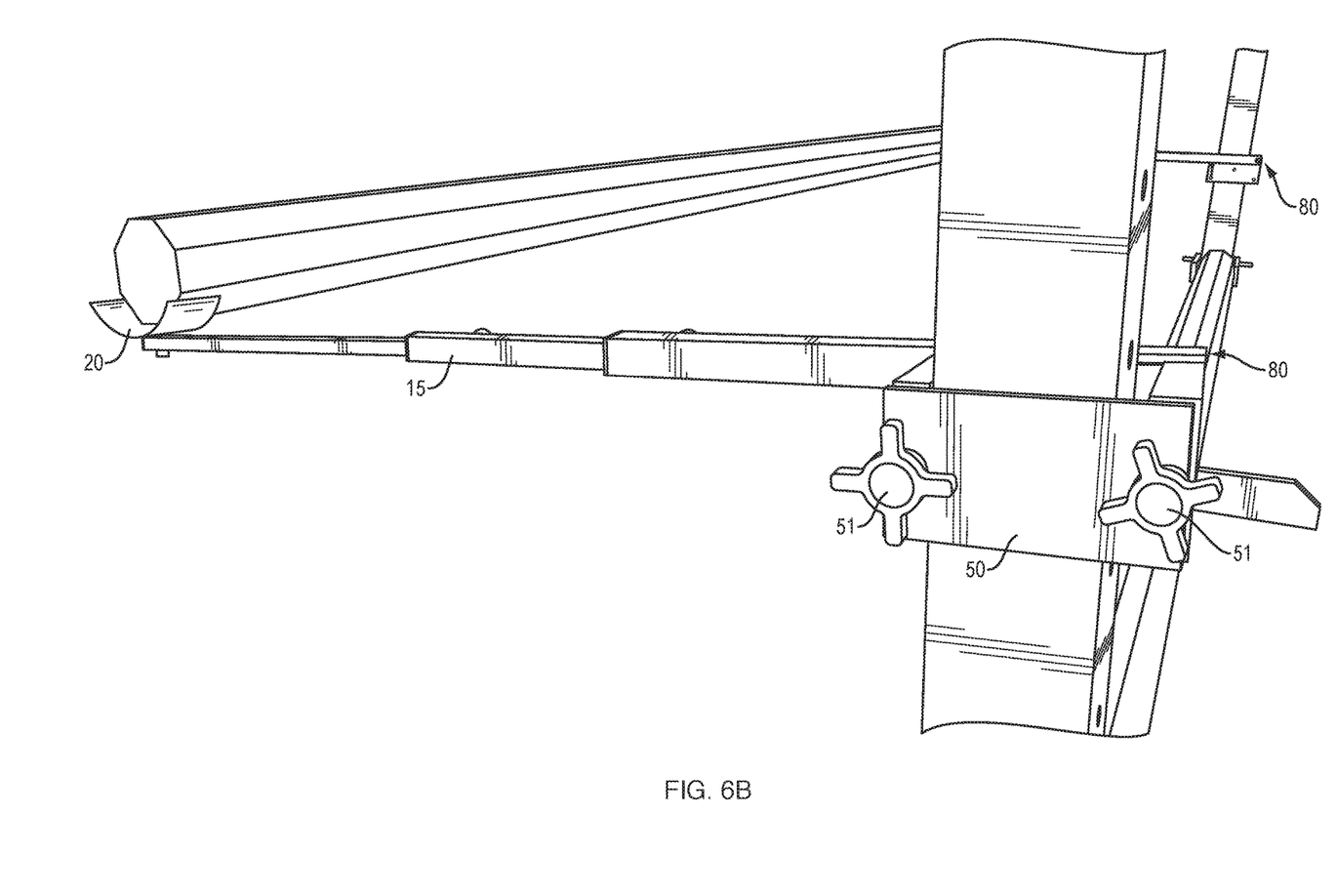

In certain embodiments of the present invention, the device may contain auxiliary jump cups only. Referring to FIG. 6A, one embodiment of the present invention is shown with an auxiliary jump cup located at the end of the arm 15. In FIG. 6A and FIG. 6B, the auxiliary jump cup is shown such that the second pole 2 does not extend to the outermost edges of the jump cup 20. This is not ideal because the pole may break away too easily. In certain embodiments of the present invention, the device is angled inward at the far end such that the second pole 2 is held more securely in the auxiliary jump cups 20 while retaining the first pole in the jump cup when a jump cup is attached to the end of the arm attached to the standard (not shown). In certain embodiments, the auxiliary jump cup is not offset toward the inside of the jump, but rather is centered on the arm, as an offset may create torque on the standard and increase the likelihood of the standard tipping over.

Referring to FIG. 6B, one embodiment of the present invention is shown with auxiliary jump cups 20 located at the end of the arm 15. More particularly, the arms 15 are pivotally mounted 80 to the mounting bracket 50. In certain embodiments of the present invention, the mounting bracket comprises tension screws 51. In certain embodiments, the device slides easily over a standard and is secured in place at any height. In certain embodiments, the mounting bracket may attach to the standard in a variety of ways including, but not limited to clamps, pins, keyhole slots, suction, magnets, self-adhesives, and the like. In certain embodiments, the mounting bracket may further comprise a jump cup. In certain embodiments, the jump cups may attach to the standard and/or the mounting bracket in a variety of ways including, but not limited to clamps, pins, keyhole slots, suction, magnets, self-adhesives, and the like.

Figure 7:
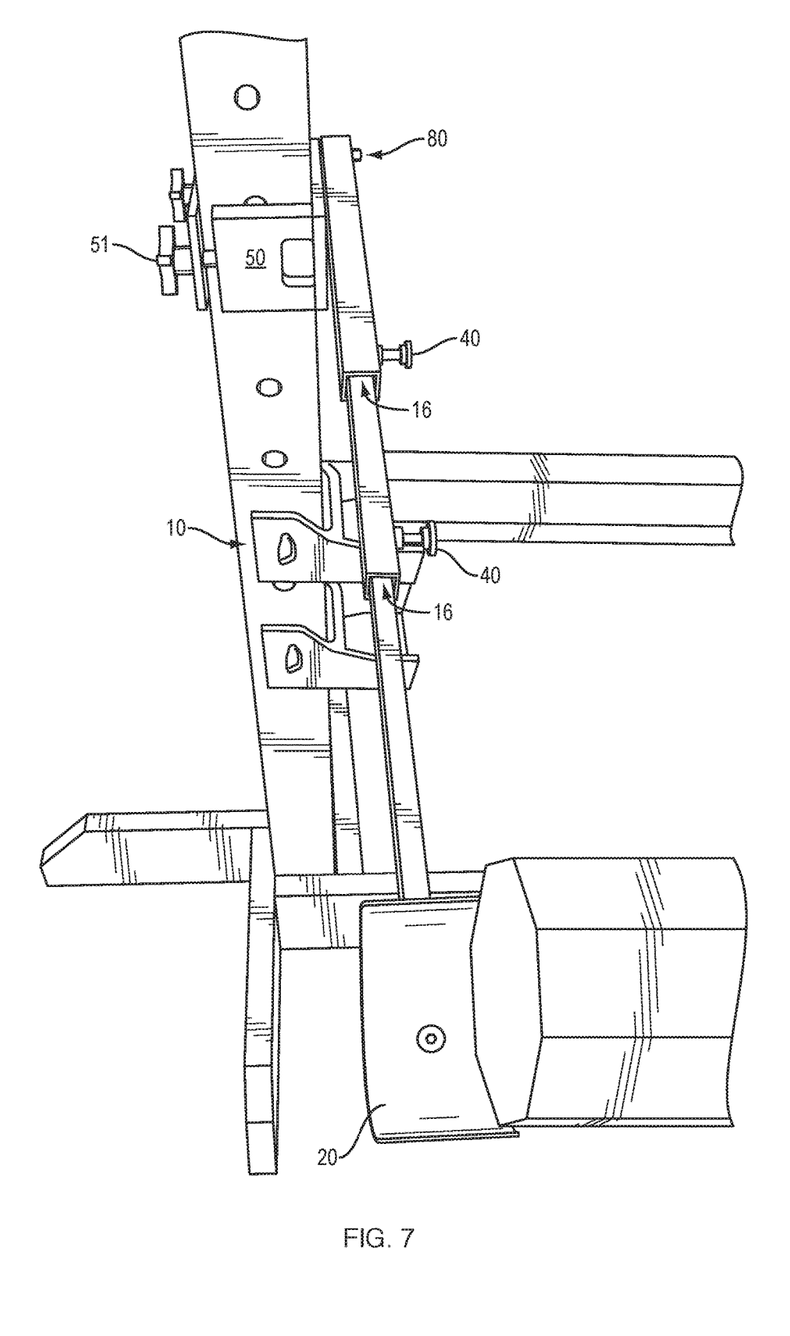
FIG. 7 shows one embodiment of the device of the present invention having a clamp style mount.

Referring to FIG. 7, one embodiment of the device is shown having a clamp-type mounting bracket 50 with no jump cup located on the mounting bracket. As shown in FIG. 7, the jump cups 10 are separate from the device and can be adjusted individually. Additionally, the arm 15 is adjusted lengthwise using screws 40. In certain embodiments of the present invention, the screws 40 are located toward the outside of the arm (unlike those shown in FIG. 7) to avoid potential injury to the horse and/or rider. Screws 40 are useful in providing very fine adjustment to the length of the arm, with no preset lengths.

In certain embodiments of the present invention, the device may contain various safety features. In certain embodiments, the safety feature may comprise a break away mechanism. In certain embodiments, the break away mechanism may be weight based, may utilize a spring, may utilize a fragile or sheer pin, may use a friction clamp or hinge, or the like.

In certain embodiments of the present invention, the device may require alteration of existing standards. In certain embodiments of the present invention, the device may comprise metal, aluminum, steel, plastic, composite, carbon fiber, wood, or any combination thereof. In certain embodiments, the device may be designed to have a left/right side. In certain embodiments, the device may be designed to have a top/bottom side. In certain embodiments, the device may be designed to be universal. In certain embodiments, the device may comprise a single/unified mold.

In certain embodiments of the present invention, the device may be colored. In certain embodiments of the present invention, the device may be reflective or non-reflective.

In certain embodiments of the present invention, the device may comprise a coating. In certain embodiments, the coating may be a rubber coating, a powder coating, and the like. In certain embodiments, the device may be water resistant, waterproof, rust proof, wear protected and the like.

Figure 8:
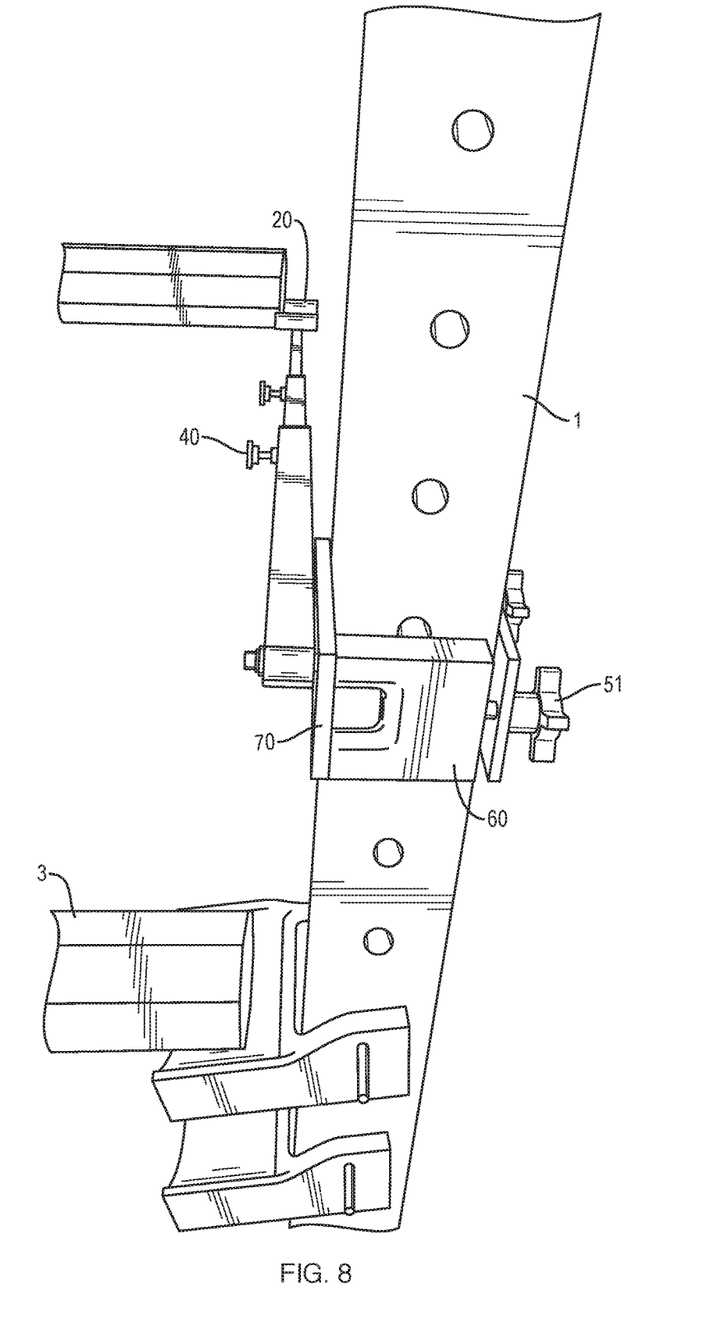
FIG. 8 shows one embodiment of the device of the present invention.

Referring to FIG. 8, one embodiment of the device of the present invention is shown. More particularly, a clamp-type mounting bracket 50 with no jump cup located on the mounting bracket is shown. In certain embodiments, the corners 70 of the mounting bracket are square. In certain embodiments, the corners of the mounting bracket are rounded to minimize the potential for injury should the animal hit the device. In certain embodiments, a counterweight is added to the device to provide balance to the device when installed on a standard. In certain embodiments, a heavy material is used in place of the spacer 60 to provide a counterweight. It is understood that a variety of counterweight styles could be used. Still referring to FIG. 8, a variety of attachment styles for jump cups can be used. The mounting bracket may or may not use the holes in the standard 1.

Figure 9:
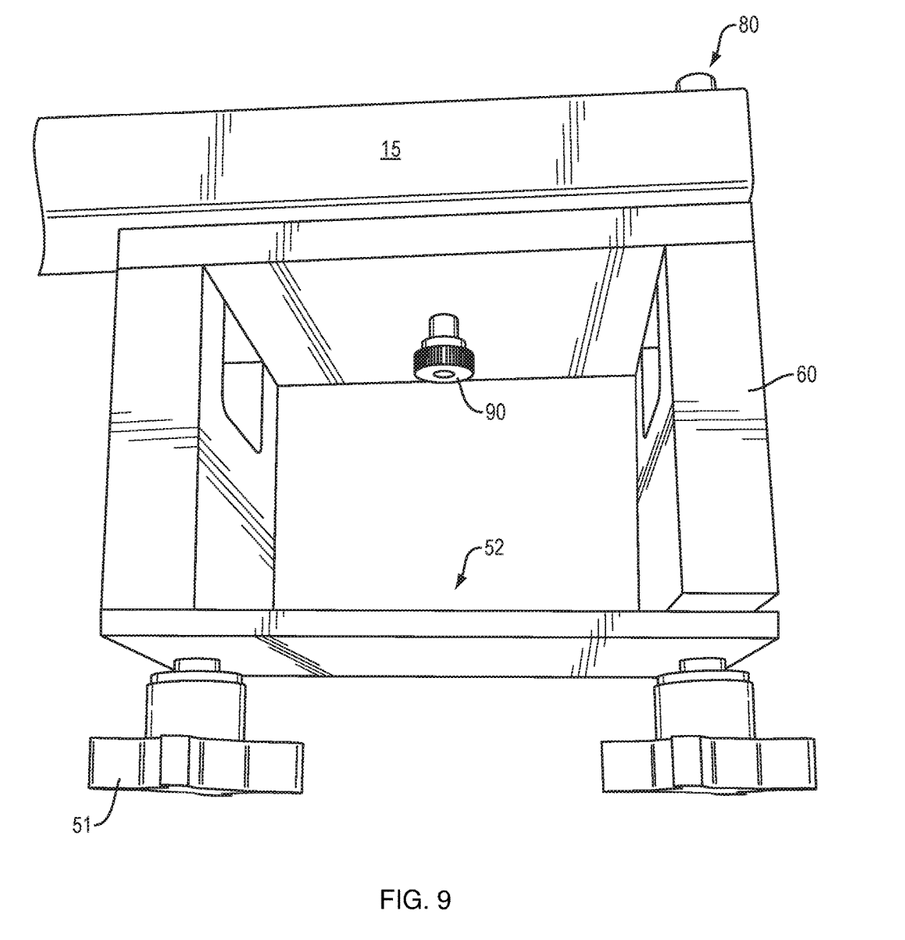
FIG. 9 shows one embodiment of the mount of the device of the present invention.

Referring to FIG. 9, one embodiment of the mounting bracket of the device is shown. More particularly, a screw 90 is used to attach the device to a keyhole-style standard. In certain embodiments, the plate 52 and tension screws 51 can be removed to facilitate attachment to a standard by another method. In certain embodiments, the spacer 60 may comprise a counterweight to balance the device when installed on a standard.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention.

What is claimed:

1. An apparatus used for creating a jump comprising: two standards having a first end and a second end, wherein a base is attached to the first end of each standard to maintain the standard in an upright orientation, wherein the two standards are parallel and spaced apart to define a vertical plane;
   two adjustable length arms, each arm having a first end and a second end, wherein each of the two arms is individually attached to and cantilevered by one of the two standards only at the first end of each arm, wherein the two arms project outward and away from the vertical plane to selectively adjust a height and depth of the jump;
   a jump cup attached to the first end of each arm with a mount; and
   an auxiliary jump cup attached to the second end of each arm.

2. The apparatus used for creating a jump of claim 1, wherein each mount attaches to each standard using a pin mechanism.

3. The apparatus used for creating a jump of claim 1, wherein the jump cup is configured to support a first pole and the auxiliary jump cup is configured to support a second pole.

4. The apparatus used for creating a jump of claim 3, wherein each arm adjustably pivots in each mount to provide staggered heights for the first and second poles.

5. The apparatus used for creating a jump of claim 1, further comprising a counterweight.

6. The apparatus used for creating a jump of claim 1, wherein each mount attaches to each standard using a clamp mechanism.

7. An apparatus used for creating a jump comprising: two standards having a first end and a second end, wherein a base is attached to the first end of each standard to maintain the standard in an upright orientation, wherein the two standards are parallel and spaced apart to define a vertical plane;
   two adjustable length arms, each arm having a first end and a second end, wherein each of the two arms is individually attached to and cantilevered by one of the two standards only at the first end of each arm, wherein the two arms project outward and away from the vertical plane to selectively adjust a height and depth of the jump; and
   a jump cup attached to each arm.

8. The apparatus used for creating a jump of claim 7, further comprising a mount attached to each standard using a pin mechanism.

9. The apparatus used for creating a jump of claim 7, wherein the jump cup is configured to support a pole.

10. The apparatus used for creating a jump of claim 9, wherein a mount attached to the first end of each arm, each arm adjustably pivots in the mount to provide an adjustable height for the pole.

11. The apparatus used for creating a jump of claim 7, further comprising a counterweight.

12. The apparatus used for creating a jump of claim 7, wherein the jump cup is slideably attached to each arm.

13. The apparatus used for creating a jump of claim 7, further comprising a mount attached to each standard using a clamp mechanism.

14. An apparatus used for creating a jump comprising: two standards having a first end and a second end, wherein a base is attached to the first end of each standard to maintain the standard in an upright orientation, wherein the two standards are parallel and spaced apart to define a vertical plane;
   two adjustable length arms, each arm having a first end and a second end, wherein each of the two arms is individually and reversibly attached to the and cantilevered by one of the two standards only at the first end of each arm, wherein the two arms project outward and away from the vertical plane to selectively adjust a height and depth of the jump; and
   a jump cup attached to the second end of each arm, wherein the jump cup is configured to support a pole.

* * * * *